UNITED STATES PATENT OFFICE.

WALTER A. JACOBS, OF MOUNT VERNON, AND WADE H. BROWN, MICHAEL HEIDELBERGER, AND LOUISE PEARCE, OF NEW YORK, N. Y., ASSIGNORS TO THE ROCKEFELLER INSTITUTE FOR MEDICAL RESEARCH, OF NEW YORK, N. Y., A CORPORATION OF NEW YORK.

ARSENICAL COMPOUND.

1,280,126.  Specification of Letters Patent.  Patented Sept. 24, 1918.

No Drawing.  Application filed January 28, 1918.  Serial No. 214,122.

*To all whom it may concern:*

Be it known that we, WALTER A. JACOBS, Ph. D., residing at Mount Vernon, Westchester county, New York, WADE H. BROWN, M. D., residing at Flushing, in the city of New York, borough of Queens, Queens county, New York, MICHAEL HEIDELBERGER, Ph. D., residing in the city of New York, borough of Manhattan, county and State of New York, and LOUISE PEARCE, M. D., residing in the city of New York, borough of Manhattan, county and State of New York, all citizens of the United States, have jointly invented a new and Improved Arsenical Compound, of which the following is a specification.

In our co-pending application, Serial No. 194,459, we have described a class of arsenical compounds of use in the treatment of trypanosomal or spirochætal infections, which may be described as an aromatic arsonic acid possessing an α-aminoacylamin side chain NHCHR.CONR'R'', in which R may be alkyl, aryl or hydrogen and R' and R'' may be alkyl or hydrogen, the aromatic nucleus being joined to the α-amino group in said side chain, and especially pointed out the value of the substance N-phenylglycin-amid-p arsonic acid. We have further found, as set forth in this application, that a new class of arsenicals, important for the treatment of trypanosomiasis or spirochætal infections, is obtained when R' or R'' is made to represent an aryl group such as phenyl, tolyl, etc., or their halogen, nitro, amino, hydroxy, alkoxy (which may include the $OCH_2COOH$, $OCH_2CONH_2$ or $OCH_2CONHCONH_2$ group), carboxy, carboxamid, carboxureid, sulfonic acid, sulfonamid, acylamino, uramino and other substitution products. Such substituting groups were used alone and in combination as polysubstituted aryl compounds. The following formula

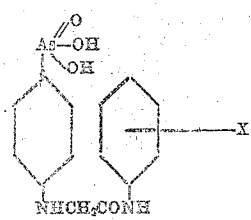

represents the type here presented, in which X represents any substituting group in the ortho, meta, or para position to the amid group. This group may occur several times or in combination with other groups on the same benzene nucleus. In the nucleus containing the arsonic acid $(AsO_3H_2)$ group, the arsonic acid group may also be in the ortho or meta position and may also be accompanied by other substituting groups, as described in the aforesaid co-pending application. Likewise, the $NHCH_2CONH$ chain joining the two aromatic nuclei may be changed to a homologue such as NHCHRCONH, in which R may be alkyl or aryl, as described in our co-pending application, Serial No. 194,459.

These substances, as arsonic acids, readily dissolve in equivalent amounts of dilute alkali and carbonates to form neutral and stable solutions, from which they are, as a rule, precipitated by acetic acid or mineral acids.

These substances were prepared by the reaction of the aminophenyl-arsonic acid or its homologues or isomers with α-halogenacyl aromatic amino compounds in aqueous or dilute ethyl or methyl alcoholic or dilute acetone solution. In the case of the simpler amins, heating of the phenylglycin ester arsonic acid with the amins either alone or in a solvent yielded the desired compound. The following examples will demonstrate the method of preparing these substances. Many of them have not only afforded good therapeutic results but form the basis for the synthesis of other substances with still more valuable therapeutic properties. When used directly for therapeutic purposes the soluble salts are recommended, and particularly the sodium salt. The acids themselves have been described and claimed in our co-pending application, Serial No. 194,461.

*Example 1—N-(Phenyl-p-arsonic acid)-glycinanilid.*

60 grams of phenylglycin methyl ester-p-arsonic acid are mixed with 120 gm. anilin and 120 gm. methyl alcohol, and the mixture heated in the water bath until solution is complete. The methyl alcohol is allowed to boil off and the residue heated for 6 hours. On cooling, the crystalline mass is dissolved in an excess of dilute sodium hydroxid and then an excess of acetic acid is added. The phenylglycinanilid-p-arsonic acid separates as a colorless microcrystalline substance. This, after filtration, is redissolved in dilute ammonia and reprecipitated with acetic acid. The product so obtained is pure. It forms minute needles which do not melt below 280° C.

For the conversion of the above arsonic acid into its sodium salt it is suspended in a small volume of water and dissolved by adding sodium hydroxid solution until faintly alkaline to litmus. The salt is salted out by the addition of an equal volume of saturated sodium acetate solution as glistening scales. It is filtered off and washed with 20 per cent. sodium acetate solution, then 85 per cent. alcohol, and air dried.

The salt forms glistening scales containing $4H_2O$ of crystallization and dissolves readily in water.

*Example II—N-(Phenyl-p-arsonic acid)-glycinanilid.*

43.4 grams of p-aminophenylarsonic acid are dissolved in 200 cc. normal sodium hydroxid solution and treated with 52 grams iodoacetanilid and 200 cc. alcohol. In place of the iodoacetanilid the equivalent amount of bromo or chloroacetanilid can be substituted. In the case of the chloroacetanilid the addition of sodium iodid greatly facilitates the reaction.

The above mixture is boiled for several hours, during which the phenylglycinanilid-p-arsonic acid crystallizes out. This, after filtration, is purified in the usual manner, and is identical with the substance given in Example I. In the above reaction any other suitable basic substance can replace the sodium hydroxid.

*Example III—Sodium salt of N-(Phenyl-4-arsonic acid)-glycyl-4'-aminophenyl urea.*

43.4 grams of arsanilic acid are dissolved in 200 cc. of normal sodium hydroxid solution. To this 46 grams of p-chloroacetyl-aminophenyl urea, 40 grams of sodium iodid and 200 cc. of alcohol are added. The mixture is boiled under a reflux. After one hour the product separates. After cooling the mixture is filtered and the residue washed with water. The crude acid is dissolved in dilute sodium hydroxid and exactly neutralized with acetic acid. The filtrate is treated with an equal volume of saturated sodium acetate solution. On standing the sodium salt separates as microscopic needles. This is filtered and the residue washed with 20 per cent. sodium acetate and then 85 per cent. alcohol. For purification the salt is dissolved in a small volume of warm water, and precipitated by the addition of an equal volume of alcohol. The salt forms microscopic needles containing $4H_2O$ of crystallization, which are readily soluble in water.

In the above examples, instead of salting out the salts with sodium acetate, other methods usually employed for the preparation of salts may be employed. For instance, the aqueous solutions obtained by dissolving the arsonic acids in equivalent amounts of dilute sodium hydroxid or carbonate, etc., may be concentrated to small bulk or precipitated by alcohol, acetone and the like.

The foregoing are a few examples of substances falling within the spirit and scope of our invention. It will be obvious to anyone skilled in the art that many variations in the exact constitution of the substances described may be made without departing from the spirit and scope of our invention. The sodium salts of the compounds are obtained in the usual way and are especially recommended for use.

What we claim is:

1. As a new product, a soluble salt of an aromatic arsonic acid having in its molecule an α-amino-acylarylamin side chain, the aromatic nucleus containing the arsenic being joined to the α-amino group in said side chain, the acyl radical of said side chain containing a plurality of carbon atoms.

2. As a new product, a soluble salt of an aromatic arsonic acid having in its molecule an α-amino-acylarylamin side chain having the general formula—

in which R is alkyl or aryl or hydrogen and Ar is an aromatic radical.

3. As a new product, the sodium salt of an aromatic arsonic acid having in its molecule an α-amino-acylarylamin side chain, the aromatic nucleus containing the arsenic being joined to the α-amino- group in said side chain, the acyl radical of said side chain containing a plurality of carbon atoms.

4. As a new product, the sodium salt of an aromatic arsonic acid having in its molecule an α-amino acylarylamin side chain having the general formula—

in which R is alkyl or aryl or hydrogen and Ar is an aromatic radical.

WALTER A. JACOBS, PH. D.
WADE H. BROWN, M. D.
MICHAEL HEIDELBERGER, PH. D.
LOUISE PEARCE, M. D.